United States Patent
Ha et al.

(10) Patent No.: US 10,872,444 B2
(45) Date of Patent: Dec. 22, 2020

(54) DISPLAY APPARATUS AND CONTROL METHOD THEREOF

(71) Applicant: SAMSUNG ELECTRONICS CO., LTD., Suwon-si (KR)

(72) Inventors: Jihye Ha, Suwon-si (KR); Gwanhyung Kim, Suwon-si (KR); Sangho Kim, Suwon-si (KR)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/550,075

(22) Filed: Aug. 23, 2019

(65) Prior Publication Data

US 2020/0098147 A1 Mar. 26, 2020

(30) Foreign Application Priority Data

Sep. 21, 2018 (KR) .................... 10-2018-0113627

(51) Int. Cl.
| | |
|---|---|
| G06T 11/00 | (2006.01) |
| G06F 3/041 | (2006.01) |
| G06F 3/042 | (2006.01) |
| H04N 5/232 | (2006.01) |
| G06K 9/22 | (2006.01) |
| G06F 3/0488 | (2013.01) |
| G06T 11/20 | (2006.01) |
| H04N 5/262 | (2006.01) |

(52) U.S. Cl.
CPC .......... *G06T 11/001* (2013.01); *G06F 3/0425* (2013.01); *G06F 3/04166* (2019.05); *G06F 3/04883* (2013.01); *G06K 9/222* (2013.01); *G06T 11/203* (2013.01); *H04N 5/23229* (2013.01); *H04N 5/2621* (2013.01); *G06F 2203/04808* (2013.01)

(58) Field of Classification Search
None
See application file for complete search history.

(56) References Cited

U.S. PATENT DOCUMENTS

| | | | |
|---|---|---|---|
| 8,537,134 B2 * | 9/2013 | Morrison | G06F 3/0428 345/173 |
| 9,551,922 B1 * | 1/2017 | Liu | H04N 21/80 |

(Continued)

FOREIGN PATENT DOCUMENTS

| | | |
|---|---|---|
| JP | 5042437 | 10/2012 |
| JP | 2018-013873 | 1/2018 |

(Continued)

*Primary Examiner* — Martin Mushambo
(74) *Attorney, Agent, or Firm* — Nixon & Vanderhye, P.C.

(57) ABSTRACT

A display apparatus is disclosed. The display apparatus includes a touch display, a camera, and a processor configured to control the camera to capture an image including the touch display, based on an object being identified from an image captured through the camera, obtain a first position of the object on the touch display based on the image, identify whether the first position is within a predetermined distance from a second position where the touch input is sensed based on a touch input of the object being sensed on the touch display, and based on the first position being within the predetermined distance from the second position, control the touch display to display a touch trajectory corresponding to the touch input based on the identified object.

20 Claims, 14 Drawing Sheets

(56) References Cited

U.S. PATENT DOCUMENTS

| | | | |
|---|---|---|---|
| 9,658,702 B2 | 5/2017 | Holmgren et al. | |
| 10,289,203 B1* | 5/2019 | Liu | G06F 3/017 |
| 10,324,563 B2* | 6/2019 | Tretter | G06T 7/75 |
| 2001/0050669 A1* | 12/2001 | Ogawa | G06F 3/0425 |
| | | | 345/156 |
| 2005/0060658 A1* | 3/2005 | Tsukiori | G06F 3/0481 |
| | | | 715/765 |
| 2010/0110007 A1* | 5/2010 | Akimoto | G06F 3/0321 |
| | | | 345/158 |
| 2011/0308159 A1* | 12/2011 | Lee | G06F 3/0423 |
| | | | 49/25 |
| 2012/0249482 A1* | 10/2012 | Kiyose | G06F 3/0428 |
| | | | 345/175 |
| 2012/0326995 A1* | 12/2012 | Zhang | G06F 3/0425 |
| | | | 345/173 |
| 2013/0154985 A1* | 6/2013 | Miyazaki | G06F 3/0418 |
| | | | 345/173 |
| 2013/0169555 A1* | 7/2013 | Yakishyn | G06F 3/04883 |
| | | | 345/173 |
| 2013/0257825 A1* | 10/2013 | Thompson | G06F 3/0428 |
| | | | 345/179 |
| 2013/0321320 A1* | 12/2013 | Muramatsu | G06F 3/04883 |
| | | | 345/173 |
| 2014/0104168 A1* | 4/2014 | Hegde | G06F 3/017 |
| | | | 345/157 |
| 2014/0160076 A1* | 6/2014 | Ichieda | G06F 3/04883 |
| | | | 345/175 |
| 2014/0245234 A1* | 8/2014 | Lee | G06F 3/0346 |
| | | | 715/863 |
| 2014/0267089 A1* | 9/2014 | Smith | G06F 3/04847 |
| | | | 345/173 |
| 2014/0285473 A1* | 9/2014 | Chang | G06F 3/03545 |
| | | | 345/175 |
| 2014/0306889 A1* | 10/2014 | Kresl | G06F 3/042 |
| | | | 345/157 |
| 2015/0054735 A1* | 2/2015 | Nakama | G06F 3/0304 |
| | | | 345/156 |
| 2015/0227261 A1* | 8/2015 | Huang | G06F 3/03545 |
| | | | 345/175 |
| 2015/0317030 A1* | 11/2015 | Hada | G06F 3/0416 |
| | | | 345/173 |
| 2015/0317504 A1* | 11/2015 | Jermyn | G06K 9/50 |
| | | | 382/199 |
| 2016/0259486 A1* | 9/2016 | Fujimori | G06F 3/0416 |
| 2016/0320912 A1* | 11/2016 | Seto | G06F 3/04164 |
| 2016/0349925 A1* | 12/2016 | Kamamori | G06F 3/017 |
| 2016/0364118 A1* | 12/2016 | Foerster | G06F 3/0488 |
| 2016/0378311 A1* | 12/2016 | Kim | G06F 3/04817 |
| | | | 715/769 |
| 2017/0003795 A1* | 1/2017 | Lee | G06F 3/04886 |
| 2017/0038896 A1* | 2/2017 | Lee | G06F 3/044 |
| 2017/0045957 A1* | 2/2017 | Holmgren | G06F 3/0425 |
| 2017/0052632 A1* | 2/2017 | Kamamori | G06F 3/0425 |
| 2017/0060286 A1* | 3/2017 | Gasselin de Richebourg | |
| | | | G06F 3/0346 |
| 2017/0060287 A1* | 3/2017 | Gasselin de Richebourg | |
| | | | G06F 3/04886 |
| 2017/0060645 A1* | 3/2017 | Gasselin de Richebourg | |
| | | | G06F 9/54 |
| 2017/0083201 A1* | 3/2017 | Sharma | G06F 3/0486 |
| 2017/0090598 A1* | 3/2017 | Morrison | G06F 3/0421 |
| 2017/0228092 A1* | 8/2017 | Kang | G06F 3/017 |
| 2017/0351324 A1* | 12/2017 | Njolstad | G06F 3/011 |
| 2018/0196569 A1* | 7/2018 | Jun | G06F 3/0446 |
| 2018/0203566 A1* | 7/2018 | Kawasaki | G06F 3/041 |
| 2018/0232137 A1* | 8/2018 | Ma | G06F 3/04886 |
| 2018/0239437 A1* | 8/2018 | Kim | G06F 3/0481 |
| 2018/0321493 A1* | 11/2018 | Kim | G02B 27/0176 |
| 2019/0102044 A1* | 4/2019 | Wang | G06F 3/0416 |

FOREIGN PATENT DOCUMENTS

| | | |
|---|---|---|
| KR | 10-0753597 | 8/2007 |
| KR | 10-2016-0107684 | 9/2016 |
| KR | 10-1765202 | 7/2017 |
| KR | 10-2019-0035341 | 4/2019 |
| WO | 02/03316 | 1/2002 |
| WO | 2019/066273 | 4/2019 |

* cited by examiner

| ROI | Binary Image after Color Filter (ex. Blue) | Determine Color/Size/Shape |
|---|---|---|
|  ROI |  |  Blue 325 px |

| COLOR TEMPERATURE | 3180K | 3450K | 3840K | 4260K | 4700K | 5130K | 5540K | 5930K | 6150K |
|---|---|---|---|---|---|---|---|---|---|
| Hue [180°] | 12 | 5 | 2 | 170 | 161 | 138 | 125 | 117 | 114 |
| Bezel Pixel |  |  |  |  |  |  |  |  |  |

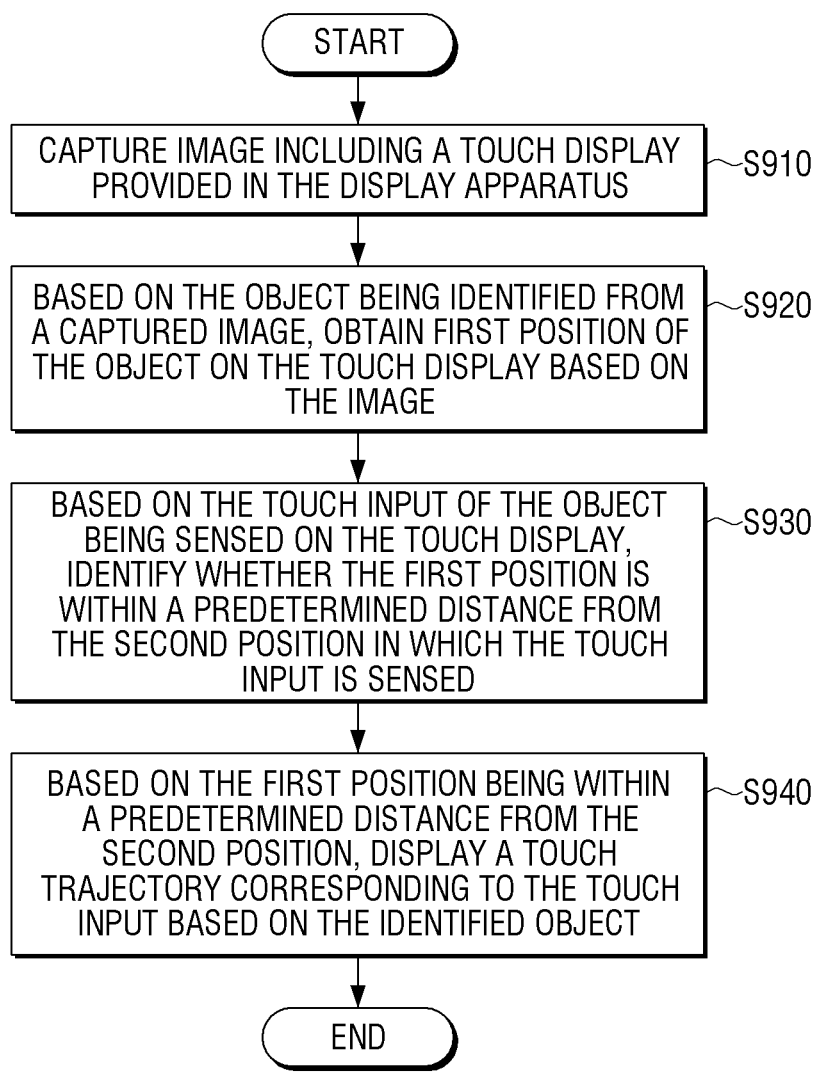

DISPLAY APPARATUS AND CONTROL METHOD THEREOF

CROSS-REFERENCE TO RELATED APPLICATION

This application is based on and claims priority under 35 U.S.C. § 119 to Korean Patent Application No. 10-2018-0113627, filed on Sep. 21, 2018, in the Korean Intellectual Property Office, the disclosure of which is incorporated by reference herein in its entirety.

BACKGROUND

Field

The disclosure relates to a display apparatus and a control method thereof and, for example, to a display apparatus usable as an electronic blackboard and a control method thereof.

Description of Related Art

The development of electronic technology has led to development of various types of electronic products, and a display apparatus which includes a touch display and may be used as an electronic blackboard has been distributed.

A conventional electronic blackboard provides a separate user interface (UI) for changing at least one of a color, a size, a thickness, and a shape of a touch trajectory. However, the setting has to be changed through a separate UI, and the setting becomes more complicated and difficult as the setting menus become diverse.

Recently, an electronic blackboard which changes the color of a touch trajectory according to the color of a touch pen used by a user through a camera and the like has been developed.

However, there is a problem in that manufacturing costs increase, as a plurality of cameras are included, or even when one camera is used, there are many limitations on a function. For example, when a touch is simultaneously performed using a plurality of touch pens, the conventional electronic blackboard may not recognize to which touch points each touch pen corresponds. Therefore, when the first touch pen is red and the second touch pen is yellow, the conventional electronic blackboard may not distinguish whether to display the first touch trajectory as a red color or a yellow color. In addition, there is the same problem with respect to the second touch trajectory as well.

There is a problem in that a delay occurs until a touch trajectory is displayed, as the color or the like of a touch pen is sensed through a camera only after a touch input is made.

There is another problem in that the camera is formed to be apart from a front surface of the electronic blackboard, and accordingly, a size of the electronic blackboard becomes large, or a user has to be positioned between the camera and the electronic blackboard and the touch pen is not recognized well.

Accordingly, there is a necessity to develop an electronic blackboard of which manufacturing cost is reduced, a size is smaller, delay in displaying of a touch trajectory is minimized, and a plurality of touch trajectories according to a plurality of touch inputs are displayed.

SUMMARY

Various example embodiments of the disclosure address the above disadvantages and other disadvantages not described above.

The disclosure provides a display apparatus capable of saving a manufacturing cost and minimizing and/or reducing delay in displaying of a touch trajectory, and a control method thereof.

According to an example embodiment, a display apparatus includes a touch display, a camera, and a processor configured to: control the camera to capture an image including the touch display based on an object being identified from an image captured through the camera, obtain a first position of the object on the touch display based on the image, identify whether the first position is within a predetermined distance from a second position where the touch input is sensed based on a touch input of the object being sensed on the touch display, and based on the first position being within the predetermined distance from the second position, control the touch display to display a touch trajectory corresponding to the touch input based on the identified object.

The processor may be configured to: identify information of at least one of a color, a size, or a shape of the object from the image, and determine at least one of the color, size, or shape of the touch trajectory based on the identified information.

The processor may be configured to: identify a region where a motion is present from a plurality of consecutive images captured through the camera, and identify a remaining region after removing a region which corresponds to at least one of a predetermined shape or a predetermined color from the region where the motion is present, as the object.

The display apparatus may further include a storage configured to store color information by color temperatures, and the processor may be configured to: identify color temperature of the image based on a bezel color of the touch display included in the image, filter a region where the motion is present based on the color information corresponding to the identified color temperature, and identify at least one of the color, size, or shape of the object based on the filtering result.

The processor may be configured to: identify a first region corresponding to the touch display and a second region corresponding to the object from the image, convert the first region to correspond to a shape of the touch display, and change a position of the second region to correspond to the converted first region, and identify the first position based on a changed position of the second region with respect to the converted first region.

The display apparatus may further include a storage, and the processor may, based on the object being identified from the image, configured to store information on at least one of the color, size, or shape of the object in the storage, and based on a touch input of the object being sensed through the touch display, control the touch display to display a touch trajectory corresponding to the touch input based on information stored in the storage.

The processor may be configured to identify a function of the object based on at least one of the color, size, or shape of the object, and control the touch display to display the touch trajectory based on the identified function.

The processor may be configured to control the touch display to display a touch trajectory corresponding to a shape of the object and the touch input.

The processor may, based on the first position exceeding the predetermined distance from the second position, be configured to control the touch display not to display the touch trajectory.

The camera may be disposed on one side of the touch display and may capture a screen of the touch display.

According to an example embodiment, a method of controlling a display apparatus includes capturing an image including a touch display provided in the display apparatus; based on an object being identified from the captured image, obtaining a first position of the object on the touch display based on the image; identifying whether the first position is within a predetermined distance from a second position where the touch input is sensed based on a touch input of the object being sensed on the touch display; and based on the first position being within the predetermined distance from the second position, displaying a touch trajectory corresponding to the touch input based on the identified object.

The displaying may include identifying information of at least one of a color, a size, or a shape of the object from the image, and determining at least one of the color, size, or shape of the touch trajectory based on the identified information.

The obtaining may include identifying a region where a motion is present from a plurality of consecutive images captured through the camera; and identifying a remaining region after removing a region which corresponds to at least one of a predetermined shape or a predetermined color from the region where the motion is present, as the object.

The identifying as the object may include identifying color temperature of the image based on a bezel color of the touch display included in the image; filtering a region where the motion is present based on the color information corresponding to the identified color temperature; and identifying at least one of the color, size, or shape of the object based on the filtering result.

The obtaining may include identifying a first region corresponding to the touch display and a second region corresponding to the object from the image; converting the first region to correspond to a shape of the touch display, and changing a position of the second region to correspond to the converted first region; and identifying the first position based on a changed position of the second region with respect to the converted first region.

The method may further include, based on the object being identified from the image, storing information on at least one of the color, size, or shape of the object in the storage, and the displaying may include displaying a touch trajectory corresponding to the touch input based on the stored information.

The displaying may include identifying a function of the object based on at least one of the color, size, or shape of the object, and displaying the touch trajectory based on the identified function.

The displaying may include displaying a touch trajectory corresponding to a shape of the object and the touch input.

The displaying may include, based on the first position exceeding the predetermined distance from the second position, not displaying the touch trajectory.

The capturing may include capturing a screen of the touch display by a camera formed on one side of the touch display.

According to various example embodiments, a display apparatus may minimize and/or reduce delay and save a manufacturing cost, by recognizing a touch pen using a camera in advance, and based on a touch being sensed, displaying a touch trajectory based on the recognized touch pen.

BRIEF DESCRIPTION OF THE DRAWINGS

The above and/or other aspects, features, and advantages of certain embodiments of the disclosure will be more apparent from the following detailed description, taken in conjunction with the accompanying drawings, in which:

FIG. 9 is a flowchart illustrating an example method of controlling a display apparatus according to an embodiment.

DETAILED DESCRIPTION

Figure 1A:
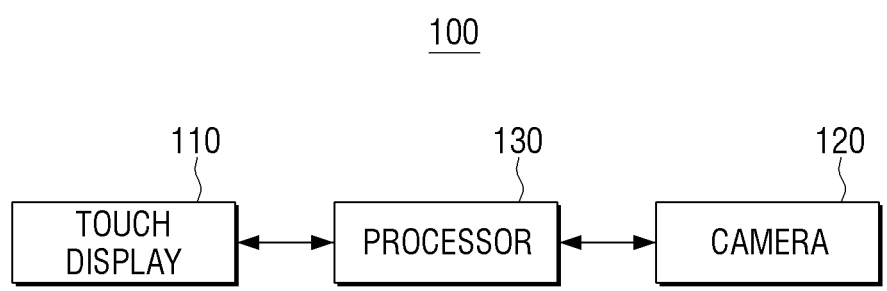
FIG. 1A is a block diagram illustrating an example configuration of a display apparatus according to an embodiment.

Various example embodiments of the present disclosure may be diversely modified. Accordingly, example embodiments are illustrated in the drawings and are described in greater detail in the detailed description. However, it is to be understood that the present disclosure is not limited to any specific example embodiment, but includes all modifications, equivalents, and substitutions without departing from the scope and spirit of the present disclosure. Also, well-known functions or constructions may not be described in detail where they might obscure the disclosure with unnecessary detail.

Hereinbelow, various example embodiments of the disclosure will be described in a greater detail with reference to the attached drawings.

FIG. 1A is a block diagram illustrating an example configuration of a display apparatus 100 according to an embodiment.

According to FIG. 1A, the display apparatus 100 includes a touch display 110, a camera 120, and a processor (e.g., including processing circuitry) 130.

The display apparatus 100 may be an apparatus for receiving a touch input and displaying a touch trajectory corresponding to the touch input. For example, the display apparatus may, for example, and without limitation, be a smartphone, a tablet PC, or the like, and may be any apparatus which is capable of receiving a touch input and displaying a touch trajectory corresponding to the touch input.

The touch display 110 may display a touch trajectory corresponding to the touch input under control of the processor 130.

The touch display 110 may be implemented as various types of a display such as, for example, and without limitation, a liquid crystal display (LCD), an organic light emitting diode (OLED) display, a plasma display panel (PDP), or the like. In the touch display 110, a driving circuit and a backlight unit, which may be implemented in the form of an a-si TFT, a low temperature poly silicon (LTPS) TFT, an organic TFT (OTFT) may be included as well.

The touch display 110 may be combined with a touch sensor and implemented as a touch screen. For example, the touch sensor may include a touch panel. The touch panel may sense a user's finger gesture input and output a touch event value corresponding to the sensed touch signal. The touch panel may be mounted under the touch display 110.

A method of sensing a user's finger gesture input by the touch panel may include, for example, and without limitation, a capacitive type, a pressure-sensitive type, or the like. The capacitive type may refer, for example, to a method for calculating a touch coordinate by sensing a minute electricity excited to a user's body. The pressure-sensitive type may include, for example, two electrode plates built in the touch panel, and when upper and lower plates of the touch point are in contact with each other, the pressure-sensitive type sensor senses that the current flows and the touch coordinates are calculated.

The touch display 110 may calculate a touch coordinate using an infrared sensor instead of the touch panel. For example, a plurality of infrared transmitters may be provided at a left and upper bezel of the display apparatus 100, and a plurality of infrared receivers corresponding to the plurality of infrared transmitters may be provided in the right and the lower bezel of the display apparatus. The infrared transmitters provided in the left bezel of the display apparatus may emit infrared rays in the direction of the right bezel of the display apparatus, and the infrared receivers provided in the right bezel of the display apparatus may receive the same. The infrared transmitters provided in the upper bezel of the display apparatus may emit infrared rays in the direction of the lower bezel of the display apparatus, and the infrared receivers provided in the lower bezel of the display apparatus may receive the same.

When an object is located on the surface of the display apparatus, some of the infrared receivers may not receive infrared rays, and x and y coordinates of the object may be determined according to the position in the bezel of the infrared receivers which do not receive the infrared rays.

The touch display 110 may further include a pen recognition panel. The pen recognition panel may sense a user's pen gesture input in accordance with operation of a touch pen (for example, a stylus pen, a digitizer pen, or the like) of a user and output a pen proximity event value or a pen touch event value. The pen recognition panel may be mounted under the touch display 110.

The pen recognition panel may be implemented with, for example, electro magnetic resonance (EMR), and may sense a touch or proximity input according to proximity of a pen or change in intensity of an electromagnetic field by a touch. For example, the pen recognition panel may include an electromagnetic induction coil sensor (not shown) and an electronic signal processor (not shown) for sequentially providing an AC signal having a predetermined frequency to each loop coil of the electromagnetic induction coil sensor. When there is a pen in which a resonance circuit is embedded in the vicinity of the loop coil of the pen recognition panel, the magnetic field transmitted from the corresponding loop coil generates a current based on the electromagnetic induction in the resonant circuit in the pen. Based on this current, an induction magnetic field is generated from a coil of a resonance circuit in the pen, and the pen recognition panel may detect the induction magnetic field from the loop coil in a signal receiving state, and an access position or a touch position of the pen may be sensed.

The processor 130 may include various processing circuitry and change the operation mode of a camera 120 and the touch panel according to whether the pen recognition panel recognizes the pen. For example, the processor 130 may deactivate the camera 120 and the touch panel to reduce power consumption if the pen is not recognized in the pen recognition panel. The processor 130 may deactivate the camera 120 and the touch panel, when the pen is recognized in the pen recognition panel. The processor 130 may control the camera 120 to capture the touch display 110 by activating the camera 120, and activate the touch panel to sense the touch input on the touch display 110 through the touch panel.

In addition, when the camera 120 is activated, the processor 130 may deactivate the pen recognition panel. When an object is not identified in an image captured by the camera 120, the processor 130 may activate the pen recognition panel.

The processor 130 may display the touch trajectory based on the position where the touch input is sensed through the pen recognition panel. This will be further described later.

The camera 120 may refer, for example, to a configuration for capturing a still image or a moving image according to the control of a user. The camera 120 may capture a still image at a specific time point, or may continuously capture still images. The camera 120 may be disposed on one side of the touch display 110 and capture a screen of the touch display 110.

The camera 120 may include, for example, and without limitation, a lens, a shutter, a diaphragm, a solid-state imaging device, an analog front end (AFE), a timing generator (TG), or the like. The shutter may adjust the time during which light reflected from the object enters the camera 120, and the diaphragm may adjust an amount of light incident on the lens by mechanically increasing or decreasing the size of an aperture through which the light enters. The solid-state imaging device may output an image as an electric signal when light reflected from an object is accumulated in a photoelectric cell. The TG may output a timing signal for reading out pixel data of a solid-state imaging device, and the AFE may sample and digitize an electrical signal output from the solid-state imaging device.

The processor 130 may control overall operations of the display apparatus 100 by controlling a configuration of the display apparatus 100.

According to an embodiment, the processor 130 may include various processing circuitry, such as, for example, and without limitation, a digital signal processor (DSP), a microprocessor, a time controller (TCON), or the like, but is not limited thereto. The processor 130 may include, for example, and without limitation, one or more of a central processing unit (CPU), a micro controller unit (MCU), a micro processing unit (MPU), a controller, an application processor (AP), a communication processor (CP), an Advanced Reduced instruction set computing (RISC) Machine (ARM) processor, or the like, or may be defined as a corresponding term. The processor 130 may be implemented in a system on chip (SoC) type or a large scale integration (LSI) type which a processing algorithm is built therein or in a field programmable gate array (FPGA) type.

The processor 130 may control the camera 120 to capture the touch display 110 and identify the object in the image captured through the camera 120. For example, the processor 130 may identify the touch pen in the image. For example, the processor 130 may identify a touch pen with a particular pattern. The processor 130 may identify the user's arm and identify the touch pen located at one side of the user's arm. Here, the camera 120 may be installed to capture a screen of the touch display 110.

The processor 130 may identify a region where there is a motion (motion region) from a plurality of consecutive images captured through the camera 120, and identify a remaining region which is obtained by removing a region corresponding to at least one of a predetermined shape and a predetermined color from the motion region as the object.

For example, when the user touches the touch display 110 using the touch pen, the processor 130 may capture a scene in which a touch is input through the camera 120 as a plurality of consecutive images. The processor 130 may identify a region in which the user's arm moves, from a plurality of consecutive images, and identify a touch pen by removing the skin color among the identified regions. The processor 130 may remove a thick portion of the identified region and identify a relatively thin touch pen.

The display apparatus 100 may further include a storage (not shown) in which color information by color temperature is stored, and the processor 130 may identify the color temperature of an image based on the bezel color of the touch display 110 included in the image, filter a motion region based on the color information corresponding to the identified color temperature, and identify at least one of a color, size, and shape of the object based on the filtering result.

For example, the display apparatus 100 may store information on the bezel color, and the processor 130 may identify the color temperature of the image based on the bezel color of the touch display 110 included in the captured image and the stored information. The processor 130 may then filter the motion region based on the color information corresponding to the identified color temperature. For example, the processor 130 may filter only a red color range of the color information corresponding to the identified color temperature to identify whether the object is included in the filtered region. If the object is a touch pen in red, the filtered region may include an image in the form of a touch pen. The processor 130 may filter only the yellow color range among the color information corresponding to the identified color temperature to identify whether the object is included in the filtered region. If the object is a red touch pen, the filtered region may not identify a particular shape. The processor 130 may repeat this operation with a predetermined type of color range to identify the object. In the above example, if the filtered region includes a red touch pen shape, the processor 130 may identify at least one of the color, size, and shape of the identified object.

The operation of identifying the color temperature of the image is to address a problem that may occur in the operation process of the white balance function of the camera 120. In general, the camera 120 may adjust the white balance based on the color information in the capturing range. If, for example, most of the capturing range is blue, green, or the like, the color of the captured image may be distorted due to erroneous operation of the white balance function. For example, both the bezel color of the touch display 110 in the captured image and the color of the object may be distorted. Therefore, the processor 130 may obtain a color that is close to the actual object color from the distorted color of the object using the bezel color of the touch display 110 which is distorted in the same manner.

When the object is identified in the image, the processor 130 may obtain a first position of the object on the touch display 110 based on the image.

For example, the processor 130 may identify a first region corresponding to the touch display 110 from the image and a second region corresponding to the object, convert the first region to correspond to a shape of the touch display 110, change a position of the second region to correspond to the converted first region, and identify the first position based on a changed position of the second region with respect to the converted first region.

The image captured by the camera 120 may include the touch display 110 in a distorted rectangular shape, instead of a rectangle-shaped touch display 110. For example, the rectangular touch display 110 may be captured in another form. Accordingly, a relative position of the object on the touch display 110 included in the image may be different from the relative position of the object on the real touch display 110. The above operation is intended to correct this distortion.

When the touch input of the object is sensed on the touch display 110, the processor 130 may identify whether the first position is within a predetermined distance from a second position in which the touch input is sensed, and if the first position is within the predetermined distance from the second position, the processor 130 may control the touch display 110 to display a touch trajectory corresponding to the touch input based on the identified object.

For example, the processor 130 may identify at least one information from among a color, size, shape of the object from the image, and determine at least one of the color, size, and shape of the touch trajectory based on the identified information.

For example, the processor 130 may identify the red touch pen from the image and control the touch display 110 to display the red touch trajectory.

If the first position exceeds a predetermined distance from the second position, the processor 130 may control the touch display 110 not to display the touch trajectory.

The example embodiment described above is not limited thereto, and if the first position exceeds a predetermined distance from the second position, the processor 130 may correct the second position based on the first position. For example, the processor 130 may control the touch display 110 to display the touch trajectory as a coordinate value which is obtained by averaging a coordinate value of the first position and a coordinate value of the second position.

When the first position exceeds a predetermined distance from the second position, the processor 130 may control the touch display 110 to ignore the first position and display the touch trajectory based on the second position.

If the touch display 110 includes the pen recognition panel, when the first position exceeds a predetermined distance from the second position, the processor 130 may control the touch display 110 to display the touch trajectory by further considering a third position sensed through the pen recognition panel.

For example, the processor 130 may control the touch display 110 to display the touch trajectory based on a position that is closer to the third position between the first position and the second position. The processor 130 may control the touch display 110 to display the touch trajectory as a coordinate value which is obtained by averaging the coordinate value of the first position, the coordinate value of the second position, and the coordinate value of the third position.

When the first position exceeds a predetermined distance from the second position, the processor 130 may modify the algorithm for obtaining the first position. For example, if the first position exceeds a predetermined distance from the second position, the processor 130 may modify the algorithm for obtaining the first position so that the second position is obtained from a relative position of the object on the touch display 110 included in the image.

The display apparatus 100 may further include a storage (not shown). When the object is identified from the image, the processor 130 may store at least one information among the color, size, and shape of the object in the storage, and when the touch input of the object is sensed through the touch display 110, the processor 130 may control the touch display 110 to display the touch trajectory corresponding to the touch input based on the information stored in the storage.

For example, the processor 130 may pre-store information on the object through the captured image, and when the touch is input to the touch display 110, the processor 130 may control the touch display 110 to immediately display the touch trajectory based on the information about the object. The processor 130 may minimize and/or reduce the delay until the touch trajectory is displayed through the above operation.

The processor 130 may identify a function of the object based on at least one of a color, a size, and a shape of the object, and control the touch display 110 to display the touch trajectory based on the identified function.

For example, when the object is in a cylinder shape, the processor 130 may display the touch trajectory to correspond to the touch input, and when the object is in a cuboid shape, the processor 130 may delete the pre-displayed contents elements to correspond to the touch input.

The processor 130 may control the touch display 110 to display the touch trajectory corresponding to the shape of the object and the touch input.

For example, when the object is in a star shape, the processor 130 may control the touch display 110 to consecutively display the contents elements in a star shape along the touch trajectory corresponding to the touch input.

Figure 1B:
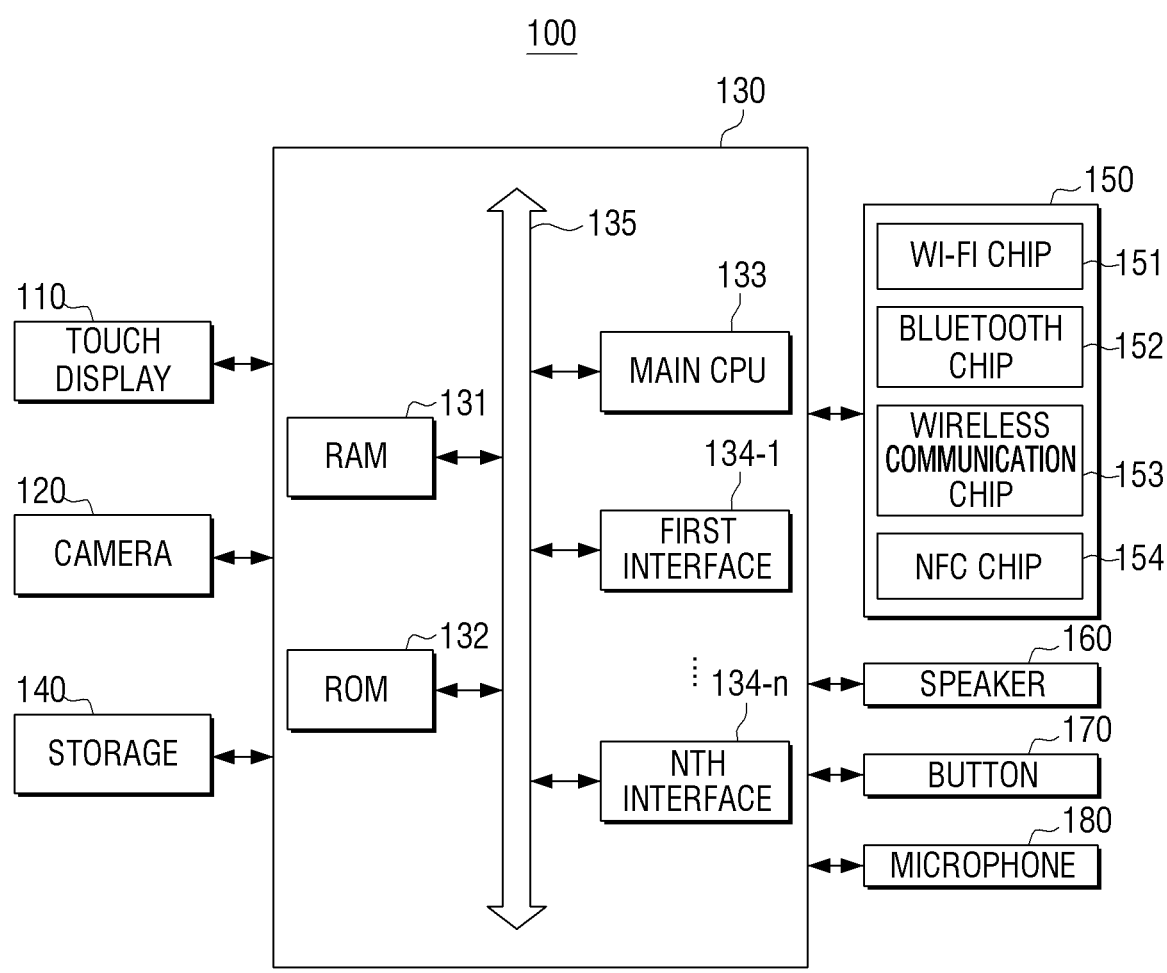
FIG. 1B is a block diagram illustrating an example configuration of the display apparatus according to an embodiment.

FIG. 1B is a block diagram illustrating an example configuration of the display apparatus 100. The display apparatus 100 may include the touch display 110, the camera 120, and the processor 130. According to FIG. 1B, the display apparatus 100 may further include a storage 140, a communicator (e.g., including communication circuitry) 150, a speaker 160, a button 170, and a microphone 180. Among the configurations of FIG. 1B, the descriptions of the configurations overlapped with the configurations of FIG. 1A may not be repeated here.

The processor 130 may include various processing circuitry and controls overall operations of the display apparatus 100 using various programs stored in the storage 140.

The processor 130 may include, for example, and without limitation, a random-access memory (RAM) 131, a read-only memory (ROM) 132, a main central processing unit (CPU) 133, a first to $n^{th}$ interface 134-1 to 134-n, and a bus 135.

The RAM 131, ROM 132, main CPU 133, and the first to $n^{th}$ interface 134-1 to 134-n, and the like, may be interconnected through the bus 135.

The first to $n^{th}$ interface 134-1 to 134-n are connected to the various elements described above. One of the interfaces may be a network interface connected to an external device through the network.

The main CPU 133 accesses the storage 140 and performs booting using an operating system (OS) stored in the storage 140. In addition, the CPU 133 performs various operations using various programs, or the like, stored in the storage 140.

The ROM 132 stores a command set for booting the system and the like. When the turn-on command is input and power is supplied, the CPU 133 copies the OS stored in the storage 140 to the RAM 131 according to a command stored in the ROM 132, and executes the OS to boot the system. When the booting is completed, the CPU 133 copies various programs stored in the storage 140 to the RAM 131, executes the program copied to the RAM 131, and performs various operations.

The main CPU 133 may generate a screen including various objects such as an icon, an image, a text, or the like. The main CPU 133 may obtain attributes such as a coordinate value at which each object is to be displayed, a shape, a size, a color, or the like according to a layout of a screen based on the received control command. The main CPU 133 may generate a screen of various layouts including an object based on the obtained attribute values. The generated screen is displayed within a display region of the touch display 110.

The processor 130 may perform processing of audio data. The processor 130 may perform various image processing such as decoding, amplifying, noise filtering, and the like, on the audio data.

The processor 130 may perform processing of video data. The processor 130 may perform various image processing such as decoding, scaling, noise filtering, frame rate conversion, resolution conversion, or the like, for the video data.

The operation of the processor 130 may be performed by a program stored in the storage 140.

The storage 140 stores various data such as, for example, and without limitation, operating system (OS) software module for driving the electronic apparatus 100, object recognition module, object information module, color information module, or the like.

The communicator 150 may include various communication circuitry (including chips that include various communication circuitry) and may perform communication with various types of external devices according to various types of communication methods. The communicator 150 may include various chips including various communication circuitry, such as, for example, and without limitation, a Wi-Fi chip 151, a Bluetooth chip 152, a wireless communication chip 153, a near-field communication (NFC) chip 154, or the like.

The Wi-Fi chip 151 and the Bluetooth chip 152 perform communication using a Wi-Fi method and a Bluetooth method, respectively. When the Wi-Fi chip 151 or the Bluetooth chip 152 is used, various connection information such as a service set identifier (SSID) and a session key may be transmitted and received first, and communication information may be used to transmit and receive various information. The wireless communication chip 153 means a chip that performs communication according to various communication standards such as IEEE, Zigbee, 3rd generation (3G), 3rd generation partnership project (3GPP), long term evolution (LTE), or the like. The NFC chip 154 refers to a chip operating in a NFC mode using 13.56 MHz band among various radio frequency identification (RF-ID) frequency bands such as 135 kHz, 13.56 MHz, 433 MHz, 860 to 960 MHz, 2.45 GHz, or the like.

The communicator 150 may further include wired communication interface such as, for example, and without limitation, a high-definition multimedia interface (HDMI), mobile high-definition link (MHL), universal serial bus (USB), display port (DP), Thunderbolt, RGB port, d-sub-miniature (D-SUB), digital visual interface (DVI), and the like. The processor 130 may be connected to an external device through wired communication interface of the communicator 150. The processor 130 may receive data from the external device through the wired communication interface.

The speaker 160 may output not only various audio data processed by the processor 130 but also various notification sounds, a voice message, or the like.

The button 170 may be a various types of a button such as, for example, and without limitation, a mechanical button, a touch pad, a wheel, or the like formed on an arbitrary region such as a front portion, a side portion, a back portion, or the like, of an outer part of the main body of the display apparatus 100.

The microphone 180 may receive an input of, for example, a user voice and/or other sound and convert the voice or sound into audio data.

Through the above method, the processor 130 may minimize and/or reduce a delay until the touch trajectory is displayed after the touch is inputted.

Hereinbelow, an operation of the display apparatus 100 will be described in greater detail with reference to the drawings.

Figure 2:
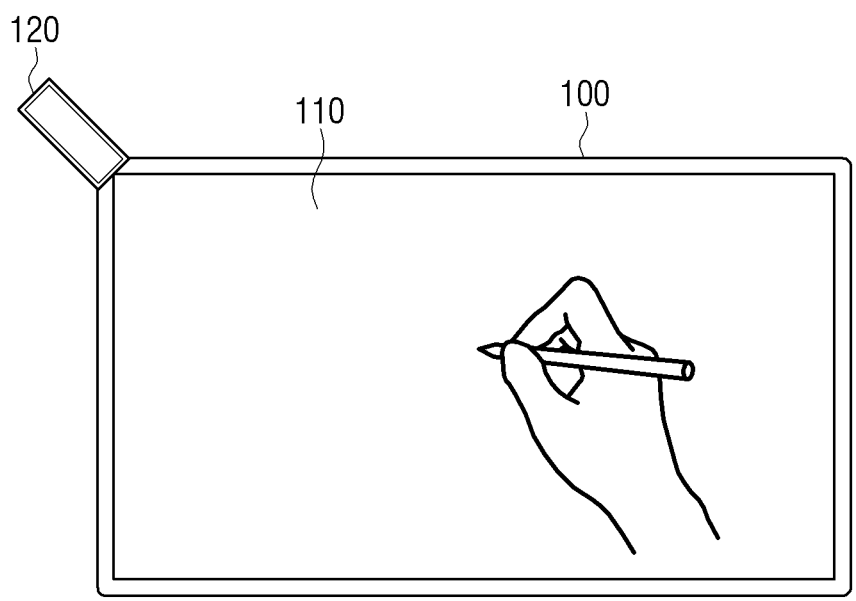
FIG. 2 is a diagram illustrating an example shape of a display apparatus according to an embodiment.

FIG. 2 is a diagram illustrating an example shape of the display apparatus 100 according to an embodiment.

As illustrated in FIG. 2, the display apparatus 100 may include the touch display 110. In addition, the display apparatus 100 may further include the camera 120 positioned at one side of the touch display 110.

The camera 120 is illustrated to be positioned or disposed at an upper left side of the touch display 110, but this is merely an example. For example, the camera 120 may be positioned at an upper right side of the touch display 110, or at any other position if a screen of the touch display may be captured.

In addition, the camera 120 may be positioned at a position which may minimize and/or reduce an amount of the screen of the touch display that is concealed or blocked by a user. For example, when the camera 120 is protrudes to a front surface of the touch display 110, while the touch input of the user is present, the user's head, neck, etc. may be captured. For example, the screen of the touch display is more concealed or blocked than in the case where the camera 120 is positioned on the upper left side of the touch display 110, and therefore, it may be inappropriate as a mounting position of the camera 120.

The camera 120 may be positioned where the touch input of the user is not hindered.

Hereinbelow, for convenient description, it has been described that the camera 120 is formed at an upper left of the touch display 110.

FIGS. 3A, 3B, 3C and 3D are diagrams illustrating an example method for identifying an object from an image according to an embodiment.

Figure 3A:
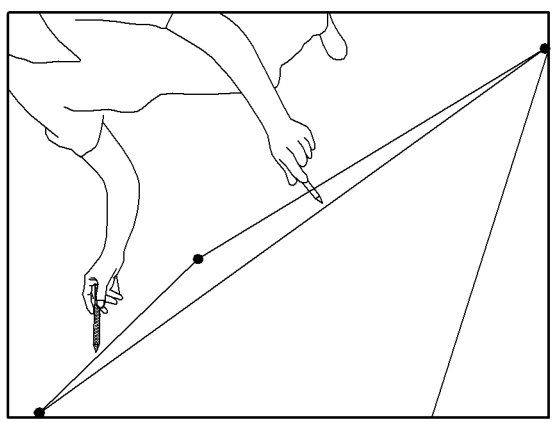
FIG. 3A is a diagram illustrating an example method for identifying an object from an image according to an embodiment.

As illustrated in FIG. 3A, the processor 130 may control the camera 120 to capture an image including the touch display 110.

In particular, the processor 130 may obtain a plurality of consecutive images through a plurality of capturing. On the other hand, the processor 130 may control the camera 120 to perform a moving image capturing.

The processor 130 may identify a region where a motion is present from a plurality of consecutive images, and remove a remaining background region except the region where a motion is present. The processor 130 may identify a remaining region other than a region corresponding to at least one of a predetermined shape and a predetermined color from a region where a motion is present, as the object.

Figure 3B:
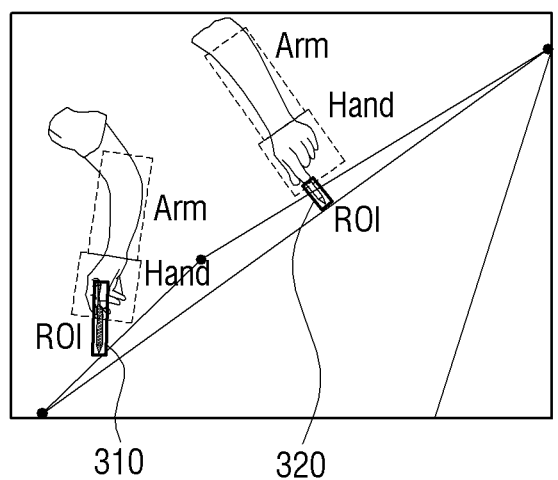
FIG. 3B is a diagram illustrating an example method for identifying an object from an image according to an embodiment.

As illustrated in FIG. 3B, the processor 130 may identify regions where a motion of both arms is present from the plurality of consecutive images, and identify arms and hands from each region. The processor 130 may identify a predetermined region as a region of interest (ROI) 310 and 320 from one side of the hands. The other side of the hand may be connected to the arm, and one side of the hand may be an opposite direction of the other side of the hand. For example, the processor 130 may identify the ROI 310 and 320 from the latest image among a plurality of consecutive images.

Figure 3C:
FIG. 3C is a diagram illustrating an example method for identifying an object from an image according to an embodiment.
Figure 3C:
Figure 3C:

The processor 130 may identify an object by filtering each of the ROI 310 and 320. As illustrated in FIG. 3C, the processor 130 may filter each of the ROI 310 and 320 using a blue filter. In this case, when an object inside the ROI 310 and 320 is a blue color, an object may be displayed as black as the center figure of FIG. 3C, and other regions may be white. When a region in a predetermined shape is identified from the filtered ROI 310 and 320, the processor 130 may obtain a color of the filter used for filtering as a color of the object, and obtain the size and shape of the object based on the region in a predetermined shape from the filtered ROI 310 and 320. The predetermined shape may be prestored by the display apparatus 100. For example, the display apparatus 100 may store a rectangular shape, a circular shape, or the like, as a predetermined shape.

If each of the ROI 310 and 320 is filtered using a red color, but a region of a predetermined shape is not identified from each of the ROI 310 and 320, the processor 130 may repeat filtering for each of the ROI 310 and 320 with filters of different colors.

Through this method, the processor 130 may identify an object of various colors. For example, the processor 130 may identify a blue object from a first ROI 310 and identify a red object from a second ROI 320.

The processor 130 may identify an object before the touch is input to the touch display 110. That is, the processor 130 may store at least one information among a color, a size, and a shape of the object identified from the image in the storage 140. In addition, the processor 130 may obtain a first position of the object on the touch display 110 based on the image.

The processor 130 may continuously obtain the first position of the object until the touch input of the object is detected on the touch display 110. For example, if it is assumed that ten images are needed to detect an object, the processor 130 may obtain the color, size, shape, and first position of the object using ten images. After the information about the object is obtained, the processor 130 may control the camera 120 to capture the touch display 110. The processor 130 may obtain only the first position of the object from the images captured after the ten images.

Figure 3D:
FIG. 3D is a diagram illustrating an example method for identifying an object from an image according to an embodiment.
Figure 3D:
Figure 3D:
Figure 3D:
Figure 3D:
Figure 3D:
Figure 3D:
Figure 3D:
Figure 3D:

The processor 130 may identify the object by further considering the color temperature of the image. For example, the display apparatus 100 may store bezel colors by color temperatures, as shown in FIG. 3D. The processor 130 may then identify the color temperature of the image based on the bezel color of the touch display 110 included in the image, filter the ROI 310 and 320 based on the color information corresponding to the identified color temperature, and identify at least one of the color, size and shape of the object based on the filtering result.

When the color temperature is changed, a filter used for filtering may be changed as well. For example, a red filter which is used for color temperature of 3180 K may be slightly different from a red filter used for color temperature of 3450K.

Hereinabove, a method for identifying an object using a plurality of images has been described but is not limited thereto. For example, the processor 130 may identify an object from one image and this will be described in FIG. 4.

Figure 4:
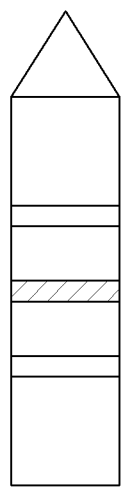
FIG. 4 is a diagram illustrating an example method of identifying an object from an image according to another embodiment.

FIG. 4 is a diagram illustrating an example method of identifying an object from an image according to another embodiment.

The display apparatus 100 may store a predetermined pattern, and when the predetermined pattern is identified, the processor 130 may set a region of the predetermined range from the identified pattern as the ROI.

For example, as illustrated in FIG. 4, the display apparatus 100 may store a pattern corresponding to three lines of the touch pen, and when three lines are identified from the image, the processor 130 may set a region of a predetermined range as an ROI from the identified line. At this time, the processor 130 may identify whether the three lines are in a predetermined pattern based on whether three lines are parallel, the color of three lines, and the like.

The processor 130 may obtain at least one of the color, size, shape, and the first position of the object from the ROI.

Through the above method, the processor 130 may identify the object from, for example, one image.

Figure 5:
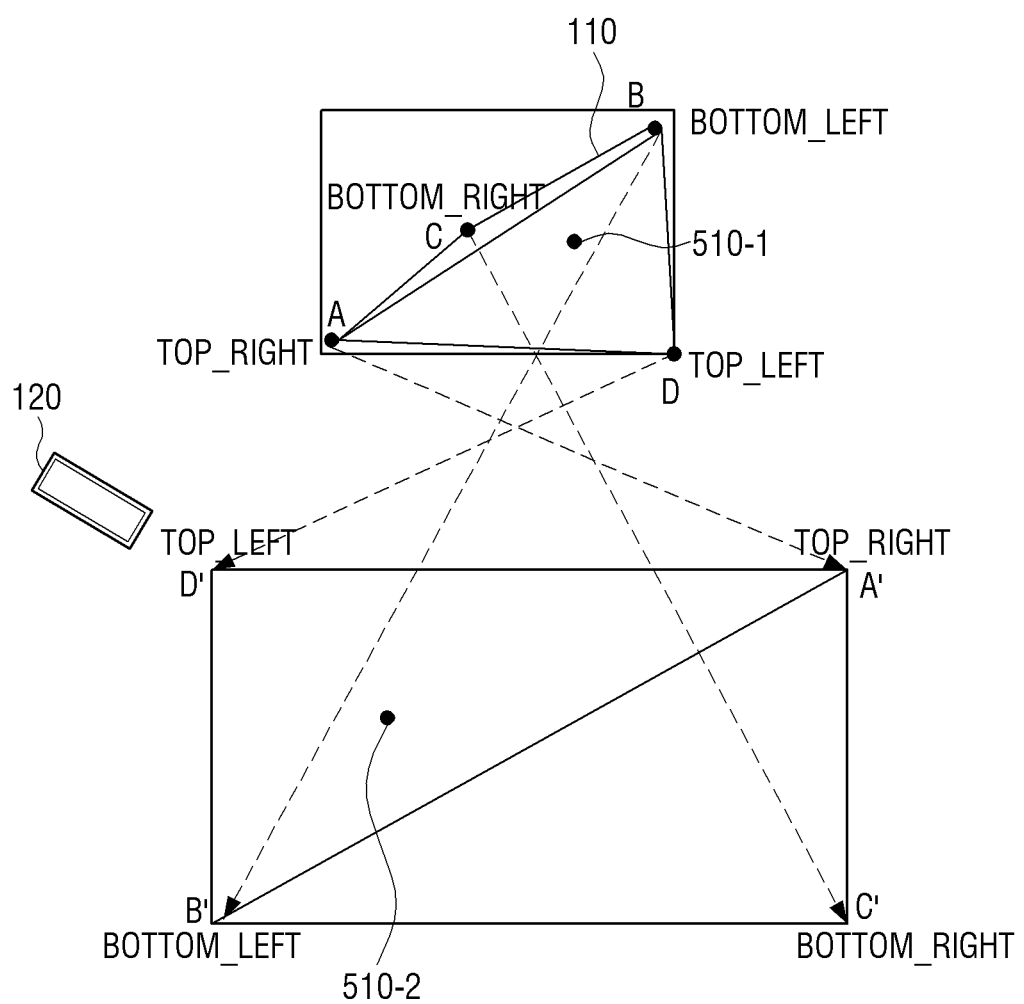
FIG. 5 is a diagram illustrating an example method for obtaining a first position of an object on a touch display according to an embodiment.

FIG. 5 is a diagram illustrating an example method for obtaining a first position of an object on a touch display 110 according to an embodiment.

As illustrated in FIG. 2, the camera 120 may be formed at one side of the touch display 110, and an image captured by the camera 120 may be as illustrated in FIG. 3A. For example, the touch display 110 may be a rectangular shape, but the touch display 110 in the image may not be a rectangular shape.

As illustrated in an upper end of FIG. 5, the processor 130 may identify a first region ACBD corresponding to the touch display 110 and a second region 510-1 corresponding to the object from the image. For convenient description, it has been described that the second region 510-1 is a point in the upper end of FIG. 5.

As illustrated in a lower part of FIG. 5, the processor 130 may convert the first region ACBD to correspond to the shape of the touch display 110, change a position of the second region 510-1 to correspond to a converted first region A'C'B'D', and identify the first position based on the changed position 510-2 of the second region 510-1 with respect to the converted first region A'C'B'D'.

Through the above operation, the processor 130 may identify at which point of the actual touch display 110, the object is located.

Figure 6A:
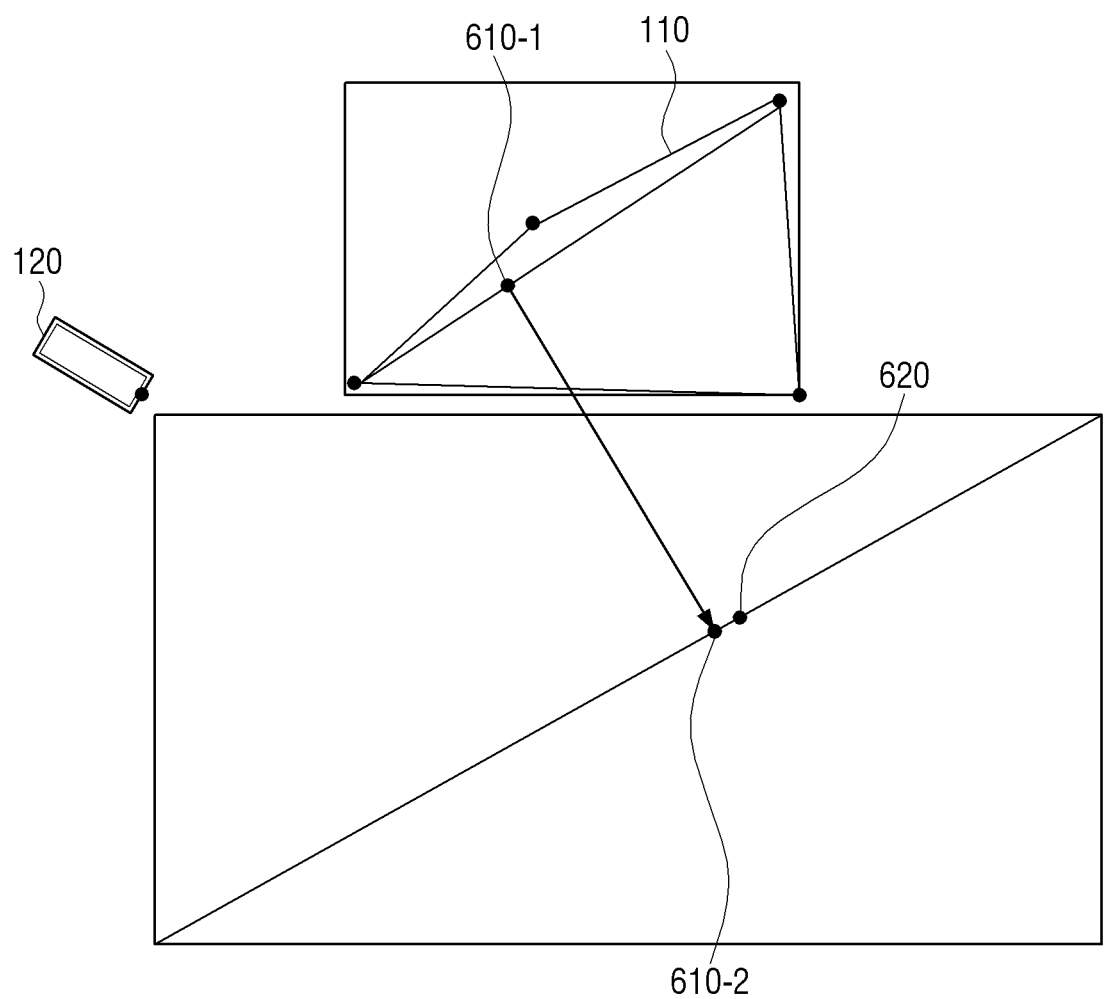
FIGS. 6A and 6B are diagrams illustrating an example operation in accordance with a touch input according to various embodiments.
Figure 6B:
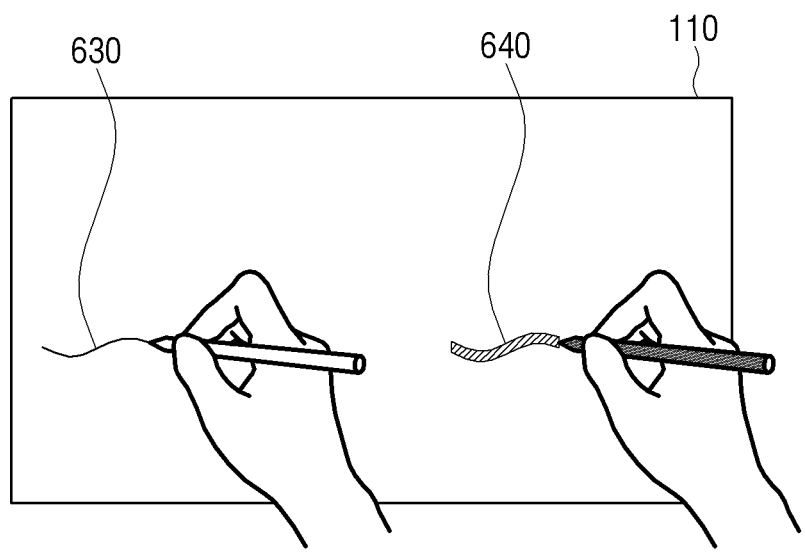

FIGS. 6A and 6B are diagrams illustrating an example operation in accordance with a touch input according to various embodiments.

As illustrated in FIG. 6A, when the touch input of the object is detected on the touch display 110, the processor 130 may identify whether a first position 610-2 is within a predetermined distance from a second position 620 where the touch input is detected. Here, the first position 610-2 may be a position obtained from the position 610-1 of the object in the image captured by the camera 120, as described in FIG. 5.

When the first position 610-2 is within a predetermined distance from the second position 620, the processor 130 may control the touch display 110 to display the touch trajectory corresponding to the touch input, based on the identified object.

When the first position 610-2 exceeds a predetermined distance from the second position 620, the processor 130 may control the touch display 110 not to display the touch trajectory.

Through the above operation, the processor 130 may determine which touch trajectory may use the prestored information on the object.

For example, as illustrated in FIG. 6B, when the first object and the second object are identified, the processor 130 may store in the storage 140 the information on the first object and the second object before the touch input is detected. Here, each of the information on the first object and the information on the second object may include the first position of the first object and the first position of the second object.

When a plurality of touch inputs are detected, the processor 130 may compare the first position of the first object and the first position of the second object with the second position where the plurality of touch inputs are detected, and identify an object corresponding to each of the plurality of touch inputs.

When the first object corresponds to the first touch input and the second object corresponds to the second touch input, the processor 130 may control the touch display 110 to display a first touch trajectory 630 corresponding to the first touch input based on the information on the first object and a second touch trajectory 640 corresponding to the second touch input based on the information on the second object.

Figure 7:
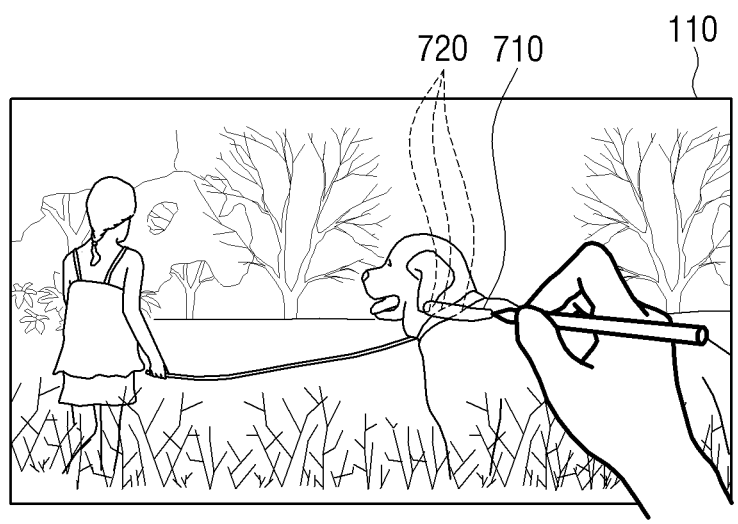
FIG. 7 is a diagram illustrating an example function of an object according to an embodiment.

FIG. 7 is a diagram illustrating an example function of an object according to an embodiment.

The processor 130 may identify a function of the object based on at least one of the color, size, and shape of the object and control the touch display 110 to display the touch trajectory based on the identified function.

For example, as illustrated in FIG. 7, if an object corresponds to an eraser function, the processor 130 may delete a contents element 720 pre-displayed to correspond to a touch trajectory 710.

When the object corresponds to a sharpening function, the processor 130 may correct a line included in the pre-displayed content element to correspond to the touch trajectory sharply.

When the object corresponds to a blurring function, the processor 130 may correct a pre-displayed contents element to correspond to the touch trajectory to be blurred.

A function of the object may have an influence only on a region where a touch input is made.

An object having an eraser function may, for example, be in the form of a rectangular parallelepiped like an eraser, an object having a sharpening function may, for example, be in the form of an awl, and an object having a blurring function may, for example, be in a form that an end part is in a dome shape. However, the embodiment is not limited thereto, and it is possible to distinguish the functions of the object in any other form. The function of the object may be distinguished based on at least one of color, size and shape.

The display apparatus 100 may prestore a function according to a shape of the object, or the like.

There may an object having as many as diverse functions other than the functions as described above.

Figure 8:
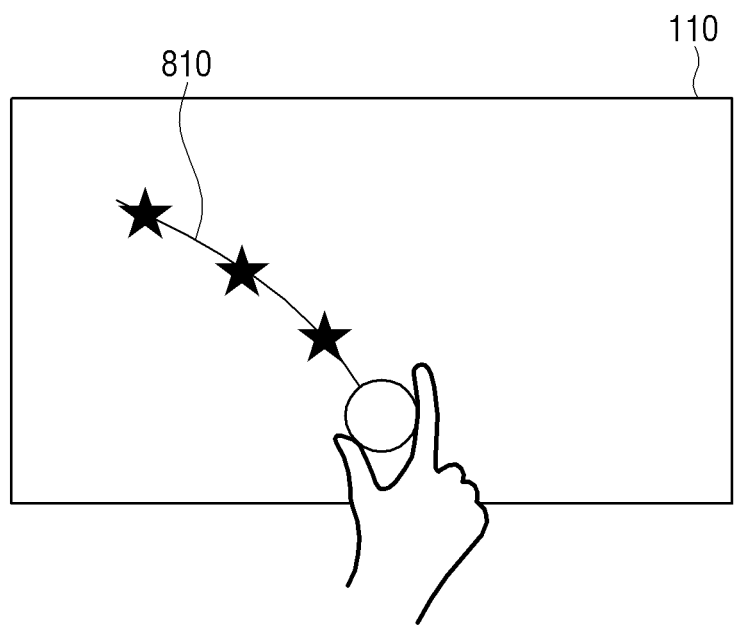
FIG. 8 is a diagram illustrating an example operation that a shape of an object influences over a touch trajectory according to an embodiment.

FIG. 8 is a diagram illustrating an example operation that a shape of an object influences over a touch trajectory according to an embodiment.

The processor 130 may control the touch display 110 to display the touch trajectory corresponding to the shape of the object and the touch input.

For example, as illustrated in FIG. 8, when the touch input is detected by a sphere-shaped object, although the touch trajectory is in a line shape 810, a star shape may be displayed consecutively according to the touch trajectory of the line shape 810.

For example, the touch display 110 may detect the touch input of the line shape 810, but the star shape may be displayed at a region where the touch input is not detected.

The embodiment is not limited thereto, and a shape of the object and a display shape may be diverse according to the shape of the object.

FIG. 9 is a flowchart illustrating an example method of controlling a display apparatus according to an embodiment.

An image including the touch display provided in the display apparatus is captured in step S910. When the object is identified in the captured image, the first position of the object is obtained on the touch display based on the image in step S920. If the touch input of the object is sensed on the touch display, it is identified whether the first position is within a predetermined distance from the second position where the touch input is sensed in step S930. If the first position is within a predetermined distance from the second position, a touch trajectory corresponding to the touch input is displayed based on the identified object in step S940.

The step of displaying S940 may include identifying at least one information among the color, size, and shape of the object from the image and determining at least one of the color, size, and shape of the touch trajectory based on the identified information.

The step of obtaining S920 may include identifying a region where there is a motion from a plurality of consecutive captured images and identifying a remaining region which removes a region corresponding to at least one of a predetermined shape or a predetermined color from the region where there is the motion, as the object.

Identifying as the object may include identifying the color temperature of the image based on the bezel color of the touch display included in the image, filtering the motion region based on the color information corresponding to the identified color temperature, and identifying at least one of the color, size, and shape of the object based on the filtering step and the filtering result.

The step of obtaining S920 may include identifying a first region corresponding to the touch display and a second region corresponding to the object from the image, converting the first region to correspond to the shape of the touch display and changing the position of the second region to correspond to the converted first region, and identifying the first position based on the changed position of the second region with respect to the converted first region.

The step of, when the object is identified from the image, storing information of at least one of the color, size, and shape of the object, and the displaying S940 may include displaying the touch trajectory corresponding to the touch input based on the stored information.

The step of displaying S940 may include identifying a function of the object based on at least one of the color, size, and shape of the object and displaying the touch trajectory based on the identified function.

The step of displaying S940 may include displaying the touch trajectory corresponding to the shape of the object and the touch input.

When the first position exceeds a predetermined distance from the second position, the step of displaying S940 may not display the touch trajectory.

The step of capturing S910 may include capturing a screen of the touch display by the camera formed at one side of the touch display.

According to various embodiments as described above, the display apparatus may recognize the touch pen using a camera in advance, and when a touch is detected, a delay may be minimized and/or reduced by displaying the touch trajectory based on the recognized touch pen, and save a manufacturing cost.

According to an embodiment, the various example embodiments as described above may be implemented with software including instructions stored in the machine-readable storage media readable by a machine (e.g., computer). The apparatus may be an apparatus which may call instructions from the storage medium and operates according to the called instructions, and may include an electronic apparatus (e.g., electronic apparatus A) in accordance with the disclosed embodiments. When an instruction is executed by a processor, the processor may perform functions corresponding to the instruction, either directly or under the control of the processor, using other components. The instructions may include a code generated by a compiler or executed by an interpreter. A machine-readable storage medium may be provided in the form of a non-transitory storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

In addition, according to an example embodiment, the various embodiments described above may be implemented in a computer readable medium, such as a computer or similar device, using software, hardware, or combination thereof. In some cases, the embodiments described herein may be implemented by the processor itself. According to a software implementation, embodiments such as the procedures and functions described herein may be implemented with separate software modules. Each of the software modules may perform one or more of the functions and operations described herein.

Computer instructions for performing the processing operations of the apparatus according to various embodiments described above may be stored in a non-transitory computer-readable medium. The computer instructions stored in the non-transitory computer-readable medium cause a particular apparatus to perform the processing operations on the apparatus according to the various embodiments described above when executed by the processor of the particular apparatus. Non-transitory computer readable medium is a medium that semi-permanently stores data and is readable by the apparatus. Examples of non-transitory computer-readable media include CD, DVD, hard disk, Blu-ray disk, USB, memory card, ROM, or the like.

Each of the elements (for example, a module or a program) according to various embodiments may be comprised of a single entity or a plurality of entities, and some subelements of the abovementioned subelements may be omitted, The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order.

While the various example embodiments have been illustrated and described with reference to certain embodiments, the disclosure is not limited to specific embodiments, and it will be understood by those of ordinary skill in the art that various changes in form and details may be made therein without departing from the spirit and scope as defined, for example, by the following claims and their equivalents.

What is claimed is:

1. A display apparatus comprising:
a touch display;
a camera; and
a processor configured to:
control the camera to capture an image including the touch display,
based on an object being identified from an image captured through the camera, obtain a first position of the object on the touch display based on the image,
identify whether the first position is within a predetermined distance from a second position where a touch input is sensed based on the touch input of the object being sensed on the touch display, and
based on the first position being within the predetermined distance from the second position, control the touch display to display a touch trajectory corresponding to the touch input based on the identified object.

2. The display apparatus of claim 1,
wherein the processor is configured to:
identify information of at least one of a color, a size, or a shape of the object from the image, and determine at least one of the color, size, or shape of the touch trajectory based on the identified information.

3. The display apparatus of claim 1,
wherein the processor is configured to:
identify a region where a motion is present from a plurality of consecutive images captured through the camera, and
identify a remaining region after removing a region corresponding to at least one of a predetermined shape or a predetermined color from the region where the motion is present as the object.

4. The display apparatus of claim 3, further comprising:
a storage configured to store color information by color temperatures, and
wherein the processor is configured to:
identify a color temperature of the image based on a bezel color of the touch display included in the image,
filter a region where the motion is present based on the color information corresponding to the identified color temperature, and
identify at least one of the color, size, or shape of the object based on the filtering.

5. The display apparatus of claim 1,
wherein the processor is configured to:
identify a first region corresponding to the touch display and a second region corresponding to the object from the image,
convert the first region to correspond to a shape of the touch display, and change a position of the second region to correspond to the converted first region, and
identify the first position based on a changed position of the second region with respect to the converted first region.

6. The display apparatus of claim 1, further comprising:
a storage,
wherein the processor is configured to:
store information on at least one of the color, size, or shape of the object in the storage based on the object being identified from the image, and
control the touch display to display a touch trajectory corresponding to the touch input based on information stored in the storage based on a touch input of the object being sensed through the touch display.

7. The display apparatus of claim 1,
wherein the processor is configured to:
identify a function of the object based on at least one of the color, size, or shape of the object, and control the touch display to display the touch trajectory based on the identified function.

8. The display apparatus of claim 1,
wherein the processor is configured to control the touch display to display a touch trajectory corresponding to a shape of the object and the touch input.

9. The display apparatus of claim 1,
wherein the processor, based on the first position exceeding the predetermined distance from the second position, is configured to control the touch display to not display the touch trajectory.

10. The display apparatus of claim 1,
wherein the camera is positioned on one side of the touch display and is configured to capture a screen of the touch display.

11. A method of controlling a display apparatus, the method comprising:
capturing an image including a touch display provided in the display apparatus;
based on an object being identified from the captured image, obtaining a first position of the object on the touch display based on the image;
identifying whether the first position is within a predetermined distance from a second position where a touch input is sensed based on a touch input of the object being sensed on the touch display; and
based on the first position being within the predetermined distance from the second position, displaying a touch trajectory corresponding to the touch input based on the identified object.

12. The method of claim 11,
wherein the displaying comprises identifying information of at least one of a color, a size, or a shape of the object from the image, and determining at least one of the color, size, or shape of the touch trajectory based on the identified information.

13. The method of claim 11,
wherein the obtaining comprises:
identifying a region where a motion is present from a plurality of consecutive images captured through the camera; and identifying a remaining region after removing a region corresponding to at least one of a predetermined shape or a predetermined color from the region where the motion is present as the object.

14. The method of claim 13,
wherein the identifying as the object comprises:
identifying a color temperature of the image based on a bezel color of the touch display included in the image;
filtering a region where the motion is present based on the color information corresponding to the identified color temperature; and
identifying at least one of the color, size, or shape of the object based on the filtering.

15. The method of claim 11,
wherein the obtaining comprises:
identifying a first region corresponding to the touch display and a second region corresponding to the object from the image;
converting the first region to correspond to a shape of the touch display, and changing a position of the second region to correspond to the converted first region; and
identifying the first position based on a changed position of the second region with respect to the converted first region.

16. The method of claim 11, further comprising:
storing information on at least one of the color, size, or shape of the object in the storage based on the object being identified from the image,
wherein the displaying comprises displaying a touch trajectory corresponding to the touch input based on the stored information.

17. The method of claim 11,
wherein the displaying comprises identifying a function of the object based on at least one of the color, size, or shape of the object, and displaying the touch trajectory based on the identified function.

18. The method of claim 11,
wherein the displaying comprises displaying a touch trajectory corresponding to a shape of the object and the touch input.

19. The method of claim 11,
wherein the displaying comprises not displaying the touch trajectory based on the first position exceeding the predetermined distance from the second position.

20. The method of claim 11,
wherein the capturing comprises capturing a screen of the touch display by a camera positioned on one side of the touch display.

* * * * *